United States Patent Office 3,635,888
Patented Jan. 18, 1972

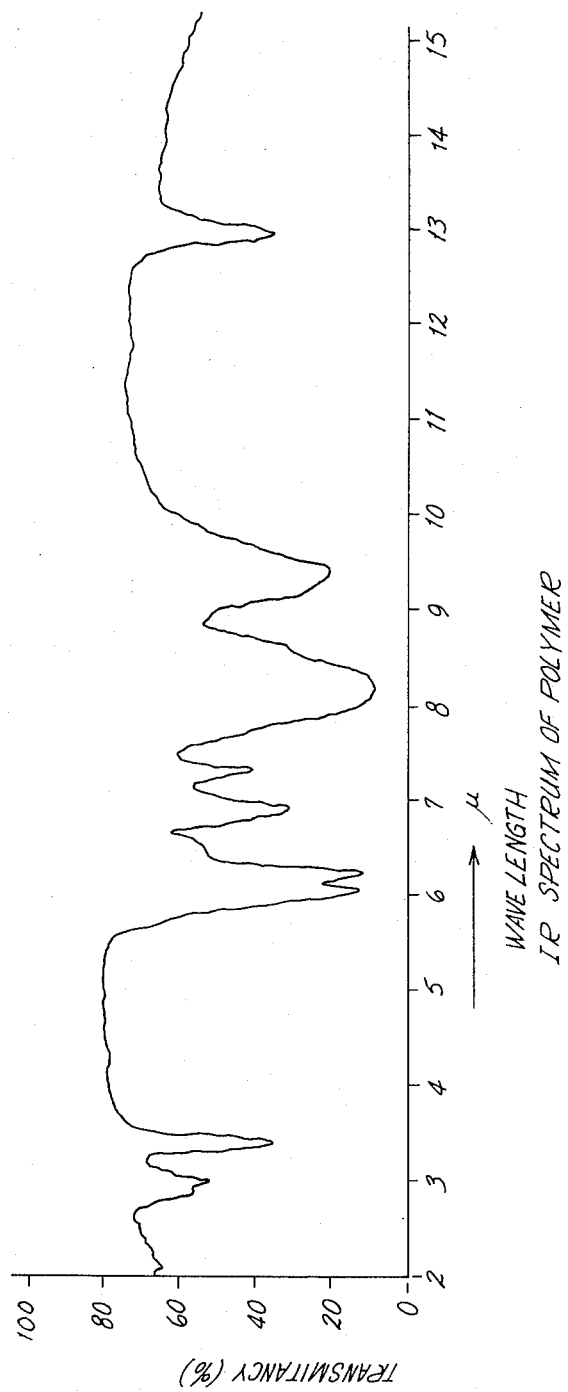

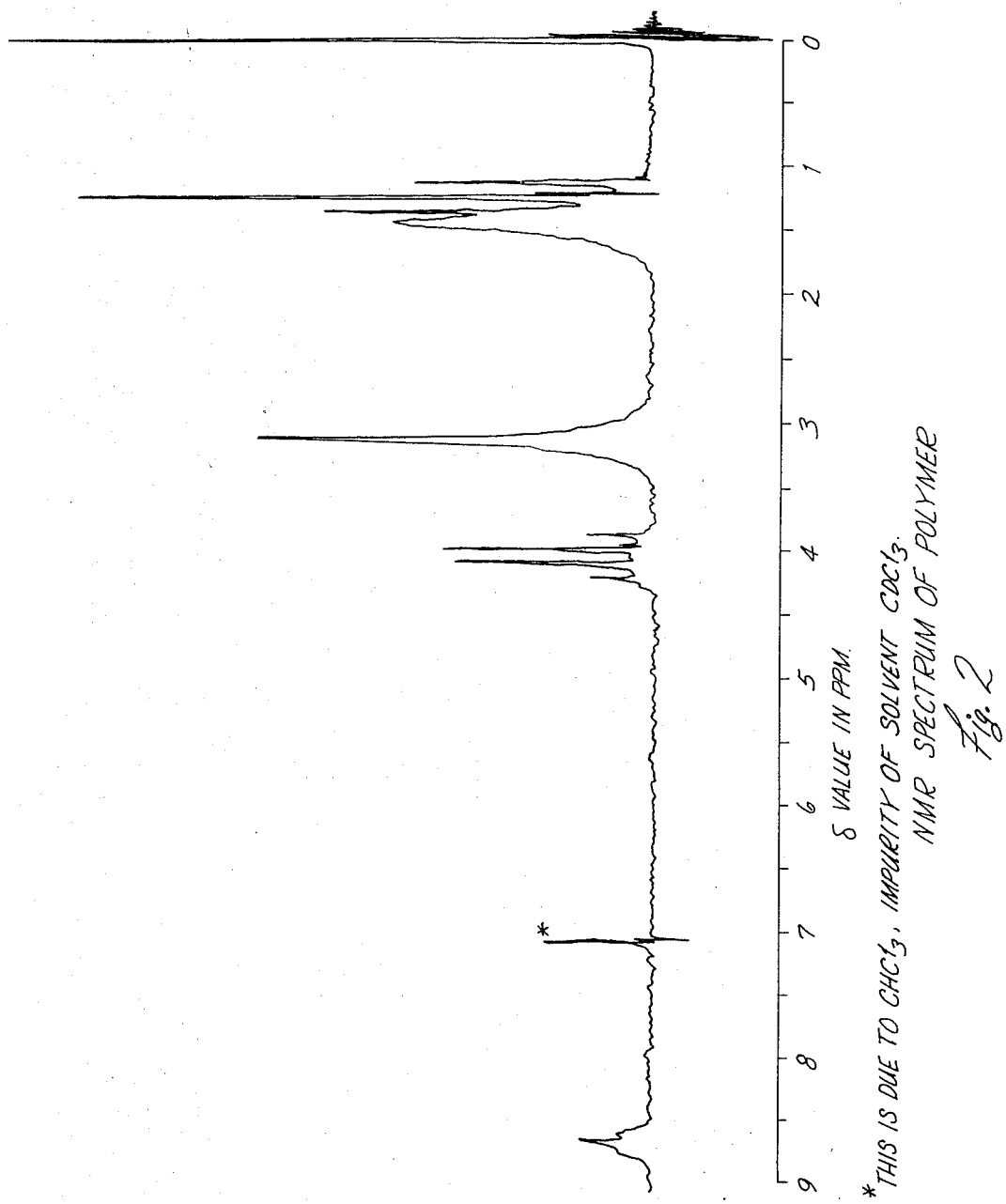

3,635,888
POLYMER DERIVED FROM DIALKYL SUCCINYL-SUCCINATES AND DIAMINES
Kazuo Adachi, Akira Tai, and Fukuji Higashi, Tokyo, Japan, assignors to Tekkosha Co., Ltd., Tokyo, Japan
Filed Feb. 16, 1970, Ser. No. 11,667
Claims priority, application Japan, Feb. 19, 1969, 44/11,825
Int. Cl. C08g 17/02, 33/06
U.S. Cl. 260—47 CP      5 Claims

ABSTRACT OF THE DISCLOSURE

A polymer, which is obtained by the reaction between dialkyl succinylsuccinate and diamine of the formula $NH_2$—R—$NH_2$ in the presence of solvents, is a new compound having recurring structural units of the formula $$\left[ R_1OOC \underset{H\;H}{\overset{H\;H}{\bigotimes}} \begin{array}{c} -NH-R-NH- \\ -COOR_1 \end{array} \right]$$

and is characterized by spectroscopic absorption I.R. spectra at the vicinities of 3.10, 6.01, 6.20 and 8.20μ and of NMR at δ3.13 and 8.70 p.p.m.

The polymer is conveniently employed as a coating for metal goods which are made of copper, iron, aluminum or the like, and as adhesive materials, and is able to be cast into films and sheets.

BACKGROUND OF THE INVENTION

Field of the invention

The present invention relates to a new polymer which is obtained by the reaction between dialkyl succinylsuccinates of the formula $$R_1OOC \underset{H\;H}{\overset{H\;H}{\bigotimes}} \begin{array}{c} -OH \\ -COOR_1 \end{array}$$

and diamines.

DESCRIPTION OF THE PRIOR ART

Heretofore, there has not been known a polymer which is obtained by the reaction between dialkyl succinylsuccinates of the formula $$R_1OOC \underset{H\;H}{\overset{H\;H}{\bigotimes}} \begin{array}{c} -OH \\ -COOR_1 \end{array}$$

(where $R_1$ represents alkyl radicals) and diamines.

SUMMARY OF THE INVENTION

A main object of this invention is to provide a new polymer which is obtained by the reaction dialkyl succinylsuccinates and diamines.

Another object of this invention is to provide a new polymer which shows excellent resistance to heat, good electric insulation, strong adhesion to metals, good resistance to corrosive chemicals such as acids and bases, and the like.

The present invention is derived from the following new findings: that is, a polymer which is obtained by the reaction between dialkyl succinylsuccinates of the formula $$R_1OOC \underset{H\;H}{\overset{H\;H}{\bigotimes}} \begin{array}{c} -OH \\ -COOR_1 \end{array}$$

and diamines of the formula $NH_2$—$R_2$—$NH_2$ in the presence of solvents is a new compound showing characteristic absorptions at 13.1, 8.20, 6.01, 6.20 and 3.10μ in the infra-red spectrum (termed hereunder I.R. spectrum) and characteristic resonances at δ3.13 (singlet) and δ8.70 in the nuclear magnetic resonance spectrum (termed hereunder NMR spectrum). Furthermore, said new polymer is conveniently employed as coatings for metal goods which are made of copper, iron, aluminum or the like, and as adhesive materials, and is able to be cast into films and sheets.

FIG. 1 shows the I.R. spectrum of the polymer which is obtained by the reaction between diethyl succinylsuccinate and hexamethylenediamine. The characteristic absorptions may be assigned to the NH stretching (around 3.1μ), C=O stretching (6.01μ, the absorption being shifted to longer wavelength by the conjugation with double bond and the influences of hydrogen binding which is formed with adjacent polar group), C=C stretching (6.20μ, the absorption being extremely intensified by the influence of polar substituents) and NH deformation (13.1μ).

FIG. 2 represents the NMR spectrum of the compound. The resonance at δ3.13 is due to the methylene protons $$(\!\!>\!\!C\!=\!\overset{|}{C}\!-\!CH_2\!-\!\overset{|}{C}\!=\!C\!\!<\!\!)$$

which are caught between two tetrasubstituted ethylenes. The resonance at δ8.70 is closely matched with that of the amino proton in diethyl-(ethylene bis-β-aminocrotonate) which was studied by Dudek et al. (J. Am. Chem. Soc., 83, 2099 (1961)). Therefore, the resonance at δ8.70 in FIG. 2 is due to the amino proton of the enamine structure in the polymer.

From the results mentioned above and those of elementary analyses, the structure of the said polymer is is assigned as follows:

$$\left[ R_1OOC \underset{H\;H}{\overset{H\;H}{\bigotimes}} \begin{array}{c} -NH-R_2-NH- \\ -COOR_1 \end{array} \right]_n$$

wherein $R_2$ represents a divalent radical selected from the group $$-(CH_2)_2-CH\underset{OCH_2}{\overset{OCH_2}{\diagdown}}C\underset{CH_2O}{\overset{CH_2O}{\diagup}}CH-(CH_2)_2-$$

consisting of $C_{4-12}$ alkylene, $$-CH_2-\!\!\bigotimes\!\!-CH_2-,\quad -CH_2-\!\!\bigotimes\!\!-CH_2-$$

$$-(CH_2)_3-O-\!\!\bigotimes\!\!\underset{CH_3}{\overset{CH_3}{-C-}}\!\!\bigotimes\!\!-O-(CH_2)_3-$$

and $$\underset{CH_3}{\overset{CH_3}{\diagdown}}\!\!\bigotimes\!\!\overset{H}{\phantom{x}}\!\!\underset{CH_3}{\overset{CH_3}{-C-}}$$

According to this invention, it is very effective to use single- or multi-component solvents which are inert to the reactions. Dimethylformamide, dimethylacetamide, N-methylpyrrolidone and dimethylsulfoxide and the like are suitable solvents for this purpose. The reaction is preferably carried out in an inert gas atmosphere, such as $N_2$, Ar and the like, at a temperature of 100 to 160° C. preferably 110 to 140° C.

The polymer is usually obtained in solution. The polymer powder is obtained when the solution is poured into solvents such as water, methanol or the like, and the resulting precipitate is gathered and dried.

The polymer which is produced according to this invention is conveniently employed as coatings for metal goods which are made of copper, iron, aluminum or the like, and as adhesive materials, and can be cast into films and sheets.

EXAMPLE 1

A mixture of 2.562 parts of diethyl succinylsuccinate and 1.162 parts of hexamethylenediamine in 20 parts of dimethylformamide was kept at 120° C. with stirring in a nitrogen atmosphere. An orange precipitate which appeared in the early stage was dissolved to a clear solution after 30 minutes. The viscosity of the system increased as the reaction proceeded and reached an asymptotis value in 4 hrs. After 5 hrs. the system was cooled to 40° C. and poured into 40 parts of cold water with vigorous stirring. The polymer which separated as a precipitate from the system was collected by filtration and dried in vacuum. The polymer was soluble in chloroform, dichloroethane, trichloroethane, tetrachloroethane or m-cresol at room temperature. It was also soluble in dimethylformamide, dimethylacetamide, N-methylpyrrolidone and cyclohexanone at elevated temperature. The average number of the molecular weight which was determined by membrane osmometry at 65° C. in cyclohexanone, was about 42,000. A hot dimethylformamide solution of the polymer was applied onto an aluminum plate and the polymer layer was dried at 120° C. for 2 hrs., in a forced draft oven and cured at 200° C. for another 1 hr. to give a reddish orange film which adhered strongly to the aluminum plate. The electric characteristics of the coating film were as follows:

Volume resistivity—$1 \times 10^{15}$ (ohm-cm.)
Dissipation factor—$2.0 \times 10^{-3}$ (at $10^3$ Hz.)
Dielectric constant—2.3 (at $10^3$ Hz.)

The adhesive strength of the polymer was measured by the T-peel test (ASTM–D1876–61T). A laminated test panel was prepared as follows: The layer of the polymer solution in dimethylformamide was doctored onto aluminum plates and dried for 6 hrs. at 60 to 80° C. in vacuum. The two precoated plates were bonded together under a pressure of 10 kg./cm.$^2$ at 220° C. for 30 minutes so as to obtain the laminated test panel.

The peeling load value of the polymer was 4.5 kg./cm.$^2$.

EXAMPLE 2

In the same manner as in Example 1, 2.283 parts of dimethyl succinylsuccinate and 1.162 parts of hexamethylenediamine were polymerized at 130° C. in 20 parts of N-methylpyrrolidone. The chemical and physical properties of the resultant polymer were substantially identical with those of the polymer which was prepared in Example 1.

EXAMPLE 3

A polymerization between 0.882 parts of tetramethylenediamine and 2.562 parts of diethyl succinylsuccinate was carried out at 130° C. for 5 hrs. in 20 parts of N-methylpyrrolidone and a viscous solution was obtained. The polymer solution was applied onto an aluminum plate. The polymer layer was dried and cured in the similar manner as in Example 1. The electric characteristics of the coating film were as follows:

Volume resistivity—$1 \times 10^{15}$ (ohm-cm.)
Dissipation factor—$2.1 \times 10^{-3}$ (at $10^3$ Hz.)
Dielectric constant—2.5 (at $10^3$ Hz.)

EXAMPLE 4

A polymerization between 2.562 parts of diethyl succinylsuccinate and 1.443 parts of octamethylenediamine in 20 parts of N-methylpyrrolidone was carried out at 120° C. for 5 hrs. in a nitrogen atmosphere and a viscous solution was obtained. The polymer was isolated in the same manner as described in Example 1. The polymer thus obtained had an average molecular weight of about 19,200 which was determined by membrane osmometry at 65° C. in cyclohexanone.

The curred polymer layer on an aluminum plate was obtained in the same way as in Example 1. The resultant layer was flexible and adhered tightly to the plate. The electric properties of the layer were as follows:

Volume resistivity—$1 \times 10^{15}$ (ohm-cm.)
Dissipation factor—$2.5 \times 10^{-3}$ (at $10^3$ Hz.)
Dielectric constant—2.3 (at $10^3$ Hz.)

EXAMPLE 5

In a similar manner to that of Example 4, 2.562 parts of diethyl succinylsuccinate and 1.443 parts of octamethylenediamine were polymerized at 110 C. in 20 parts of N-methylpyrrolidone. Chemical and physical properties of the polymer were substantially identical with those of the polymer which was prepared in Example 4.

EXAMPLE 6

A mixture of 2.006 parts of dodecamethylenediamine and 2.562 parts of diethyl succinylsuccinate were polymerized in the same way as mentioned in Example 1.

The electric properties of the polymer layer on an aluminum plate were as follows:

Volume resistivity—$7 \times 10^{14}$ (ohm-cm.)
Dissipation factor—$1.9 \times 10^{-3}$ (at $10^3$ Hz.)
Dielectric constant—1.0 (at $10^3$ Hz.)

EXAMPLE 7

A reaction of 2.562 parts of diethyl succinylsuccinate with 2.744 parts of 3,9-bis (3-aminopropyl)-2,4,8,10-tetroxaspiro (5.5)-undecane was carried out in 20 parts of dimethylformamide in the same manner as mentioned in Example 1. After 6 hrs., a viscous solution was obtained. The solution was doctored directly onto an aluminum plate and dried at 120° C. for 2 hrs. in an oven and cured at 200° C. for another one hour. The resultant polymer layer on the plate was insoluble in usual solvents and infusible. Its electric properties were as follows:

Volume resistivity—$1 \times 10^{15}$ (ohm-cm.)
Dissipation factor—$2.5 \times 10^{-3}$ (at $10^3$ Hz.)
Dielectric constant—2.3 (at $10^3$ Hz.)

EXAMPLE 8

A condensation of 2.283 parts of dimethyl succinylsuccinate with 1.142 parts of 1.4-diaminocyclohexane in 20 parts of dimethylformamide was carried out in the same manner as Example 1, and a viscous solution was obtained.

A glass cloth was immersed in the polymer solution, and the cloth was dried at 120° C. for 2 hrs. The cloths thus obtained were piled and hot pressed at 200° C. The resultant laminated plates were extremely rigid and had excellent properties as an electric insulator and had good resistance to heat. They were as follows:

Volume resistivity—$2 \times 10^{15}$ (ohm-cm.)
Dissipation factor—$6 \times 10^{-3}$ (at $10^3$ Hz.)
Dielectric constant—3.7 (at $10^3$ Hz.)

EXAMPLE 9

A reaction between 2.283 parts of dimethyl succinylsuccinate and 1.703 parts of 1,8-diamino-p-menthane in 20 parts of N-methylpyrrolidone was carried out in the same manner as in Example 1, and a viscous polymer solution was obtained. The polymer solution was applied onto an aluminum plate. The polymer layer was dried and cured in the similar manner as in Example 7. The electric characteristics of the thus obtained coated film were as follows:

Volume resistivity—$1 \times 10^{14}$ (ohm-cm.)
Dissipation factor—$2.4 \times 10^{-3}$ (at $10^3$ Hz.)
Dielectric constant—2.0 (at $10^3$ Hz.)

EXAMPLE 10

A mixture of 1.362 parts of m-xylylenediamine and 2.562 parts of diethylsuccinylsuccinate was polymerized in a similar manner to that in Example 1, and a red viscous polymer solution was obtained. The polymer solution was applied on to an aluminum plate. The polymer layer was dried and cured in the similar way as in Example 7. The electric characteristics of the thus obtained coated film were as follows:

Volume resistivity—$1 \times 10^{14}$ (ohm-cm.)
Dissipation factor—$2.0 \times 10^{-3}$ (at $10^3$ Hz.)
Dielectric constant—2.1 (at $10^3$ Hz.)

What is claimed is:
1. An adhesive or film forming polymer consisting essentially of recurring structural units of the formula

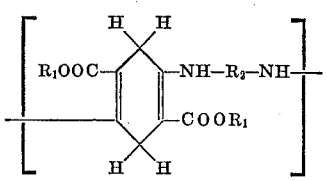

wherein $R_1$ is methyl or ethyl and $R_2$ is a divalent radical selected from the group consisting of $C_{4-12}$ alkylene,

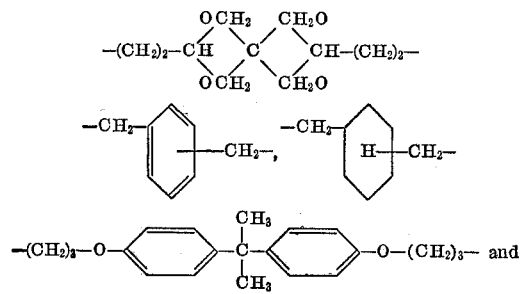

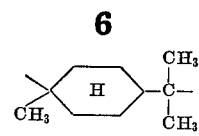

2. A process for producing a polymer which comprises reacting, in inert solvent solution, at least one dialkyl succinylsuccinate of the formula

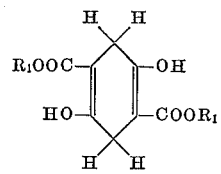

with at least one diamine of the formula $NH_2$—$R_2$—$NH_2$, wherein $R_1$ is methyl or ethyl and $R_2$ is a divalent radical selected from the group consisting of $C_{4-12}$ alkylene,

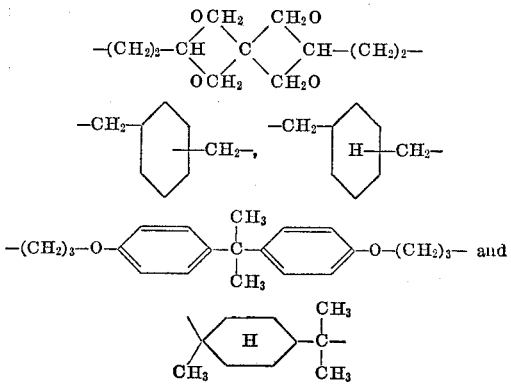

until a polymer is formed.

3. A process according to claim 2, in which said inert solvent is selected from the group consisting of dimethylformamide, dimethylacetamide, N-methylpyrrolidone, dimethylsulfoxide and mixtures thereof.

4. A process according to claim 2, in which the reaction is carried out in an inert atmosphere.

5. A process according to claim 2, in which the reaction is carried out at a temperature in the range of 100 to 160° C.

References Cited

UNITED STATES PATENTS 3,426,044   2/1969   Sparks et al. _____ 260—346.6

WILLIAM H. SHORT, Primary Examiner

L. L. LEE, Assistant Examiner

U.S. Cl. X.R.

117—132 B; 161—194, 214; 260—30.2, 30.8 DS, 32.6 N, 78 TF, 78.4 E